United States Patent [19]
Gibbs

[11] 4,253,218
[45] Mar. 3, 1981

[54] SPRING LOADED ASCENDER

[76] Inventor: Peter E. Gibbs, 854 Padley St., Salt Lake City, Utah 84108

[21] Appl. No.: 39,941

[22] Filed: May 17, 1979

[51] Int. Cl.³ .................. F16G 11/04; A44B 21/00
[52] U.S. Cl. .................................. 24/134 R; 24/254; 182/5; 188/65.1
[58] Field of Search .......... 24/134 R, 134 KB, 134 P, 24/254; 182/5, 6, 7, 8, 192; 188/65.1, 65.2

[56] References Cited
U.S. PATENT DOCUMENTS

| | | | |
|---|---|---|---|
| 1,961,081 | 5/1934 | Schrader | 188/65.2 |
| 3,179,994 | 4/1965 | Meyer et al. | 24/134 R |

*Primary Examiner*—Alexander Grosz
*Attorney, Agent, or Firm*—John B. Dickman, III

[57] ABSTRACT

A safety clamp appliance is disclosed formed of a cable or rope housing having opposed walls and a generally U-shaped cross-section, the housing interior being adapted to receive a safety rope, and a brake lever having a pivot point, a brake surface and a handle for attachment to a workman's belt. The brake lever is pivotally mounted in the housing. An actuating spring is provided for spring loading the brake lever, thereby maintaining a constant pressure by the brake surface on the rope. The actuating spring is provided with a quick release for converting the safety clamp appliance from a spring loaded mode to a non-spring loaded mode.

4 Claims, 4 Drawing Figures

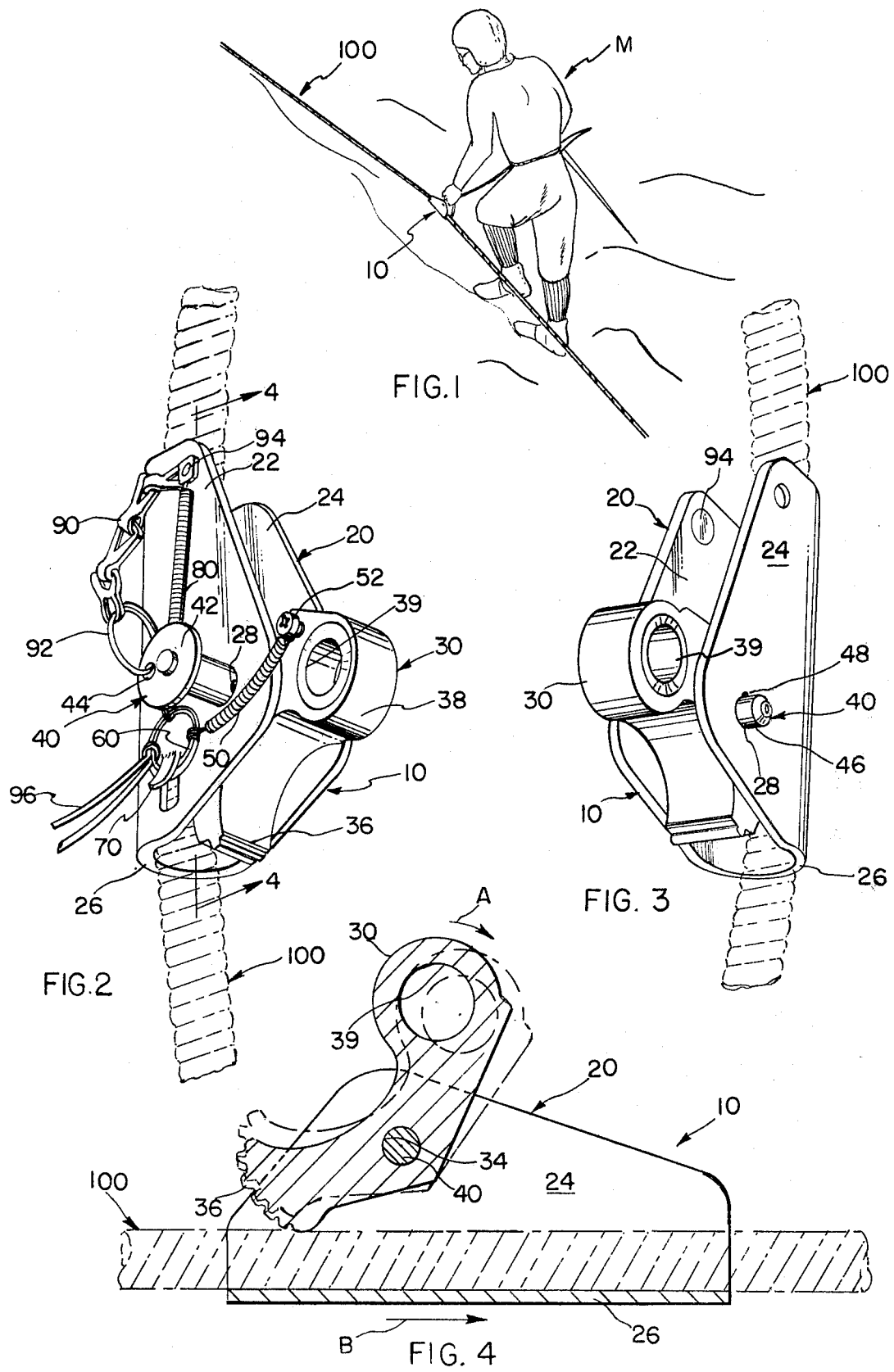

SPRING LOADED ASCENDER

BACKGROUND OF THE INVENTION

This invention relates to a safety appliance releasably attachable to an upright safety cable and adapted to clamp upon the cable to prevent falling of a workman climbing an elevated structure, and in particular to a safety clamp which is operable with or without spring loading.

Although cable safety clamp appliances have been known heretofore, it has been found that in many applications of such appliances on safety cables, there often is a need for a plurality of such devices on a cable so that a number of workmen may utilize the same safety cable in climbing to elevated positions. This often requires the connecting or disconnecting of safety clamp appliances on the safety cable depending on the number of workmen. There are also occasions where a safety clamp appliance needs to be spring loaded in order to maintain constant gripping of the safety cable as in the case of industrial workers. Other occasions require a safety clamp appliance which is easily slidable along the safety cable and, therefore, the safety clamp appliance should not be spring loaded. (Such occasions occur in mountain climbing and cave exploration.)

Prior safety clamp appliances are either spring loaded or not spring loaded. The prior art does not disclose a clamp which may be used either as a spring loaded appliance or as a non-spring loaded appliance.

A search of the prior art patents developed a number of patents which are spring loaded, these include the following:

U.S. Pat. No. 1,250,876 Hicks
U.S. Pat. No. 3,179,994 Meyer et. al.
U.S. Pat. No. 3,364,529 Blacher
U.S. Pat. No. 3,852,943 Healy
U.S. Pat. No. 4,077,094 Swager Each of the above listed patents shows a clamping safety appliance with a torsion spring contact with the safety cable. The torsion spring is fixed to the appliance in such a way that it would be difficult to remove to convert the safety clamp appliance from spring loaded to non-spring loaded. The need for a single clamp appliance which may be used in a spring loaded mode or a non-spring loaded mode would be very useful in industrial applications and in mountain climbing or cave exploration, particularly in terms of savings in time and money.

SUMMARY OF THE INVENTION

The present invention provides a rugged and reliable safety clamp appliance for connecting a workman or a climber to an upstanding safety cable or rope. Briefly, the invention includes an elongated housing having opposed walls and a generally U-shaped cross section. The housing interior has been adapted to longitudinally receive a safety rope. A brake lever is provided having an intermediate pivot point and having a brake surface on one end and a handle at the other end for attachment to a workman's safety belt. A removable pivot pin is provided to pivotally fasten the brake lever to the housing with the brake surface movable into and out of contact with a cable or rope in the housing as the handle of the lever is moved downwardly or upwardly, respectively. An actuating spring is permanently connected to the handle end of the brake lever and removably connected to the housing by a keeper ring. A second, holding, spring is permanently connected to the housing and to the keeper ring to hold the keeper ring next to housing and to prevent the brake lever from disconnecting from the housing.

It is the primary object of the improved clamping safety appliance to provide a clamping appliance which is inexpensive to manufacture that will replace existing clamping appliances which are designed for either spring loaded applications or non-spring loaded applications and not for both types of applications.

It is a further object of the improved clamping safety appliance to provide separable components readily and easily applicable to and removable from a safety cable and having a plurality of removable tensioning devices for spring loading of the clamping safety appliance which are quickly removed for non-spring loading of the clamping safety appliance.

It is another object of the improved clamping safety appliance to provide a clamping appliance which may be converted from spring-loaded to non-spring loaded without the use of tools.

BRIEF DESCRIPTION OF THE DRAWINGS

FIG. 1 is a view of a mountain climber using the improved safety clamp appliance of this invention;

FIG. 2 is a perspective view of the improved safety clamp appliance of this invention showing the two springs and the keeper ring;

FIG. 3 is a perspective view of the safety clamp appliance of the invention; and FIG. 4 is a cross-sectional view of the safety clamp appliance of the invention taken along the line 4—4 of FIG. 2.

DETAILED DESCRIPTION OF THE PREFERRED EMBODIMENT OF THE INVENTION

Referring to FIG. 1, there is shown a safety clamp appliance 10 movably attached to a safety cable or rope 100. The safety cable or rope 100 hereinafter will be referred to as rope 100. A climber M is shown using the safety clamp appliance 10 and rope 100 to ascend a mountain.

The safety clamp appliance 10 is more clearly shown in FIGS. 2, 3, and 4 which includes a housing 20, hereinafter referred to as housing 20, and a brake lever 30 connected to one another by a pivot pin 40. An actuating coil spring 50 connected to the brake lever 30 and to the housing 20 by way of a keeper ring 60 maintains the brake lever 30 in constant contact with the rope 100. The keeper ring 60 rides on a post 70 protruding from the housing 20. To prevent the actuating spring 50 and keeper ring 60 from slipping off the post 70, a holding spring 80 is provided. Holding spring 80 also serves to hold the keeper ring 60 flat against the housing 20 and to prevent the brake lever 30 from being separated from the safety clamp appliance 10. The holding spring 80 is connected to the housing 20 at one end and to the keeper ring 60 at the other end. There is also a safety chain 90 which fastens to the housing 20 and to the pivot pin 40 to prevent the pivot pin 40 from being separated from the safety clamp appliance 10. If desired, springs 50 and 80 may be made integral, from one piece of wire.

The housing 20 is formed from a sheet of metal cut and bent to provide an elongated housing having opposed side walls 22 and 24 and rear wall 26, with a generally U-shaped cross-section. The interior of the housing 20 is adapted to longitudinally receive the rope 100 and to reciprocate along the rope. Side wall 22 of the housing 20 has a protrusion or post 70 stamped out of the housing by a metal cutting die. The post 70 is bent outwardly from the plane of the side wall 22 as shown in FIG. 2. A pair of aligned apertures 28 are formed in each of the side walls 22 and 24 for receiving and holding the pivot pin 40. It is important when the housing 20 is formed so that the apertures 28 are aligned, otherwise either the pivot pin 40 will not ride in both apertures 28, or the brake lever 30 will bind against the inside surfaces of the side walls 22 or 24.

The brake lever 20 is provided with a brake surface 36 at one end and a pivot point intermediate its length in the form of an orifice 34 shown in FIG. 4. The outer rope contacting surface 36 may be roughened by transverse ridges or knurls to promote slip-free contact with the rope 100 and is eccentric with respect to the orifice 34 so that the surface swings inwardly to contact the rope 100 while the other end, or handle, 38 of the brake lever swings outwardly. The orifice 34 is aligned between the bearing apertures 28 of housing 20. To keep the rope trapped and to reduce the lateral "play" between the sides of the brake lever 30 and the inner surfaces of the housing side walls 22 and 24, the thickness of the brake lever 30 and the width of space between side walls 22 and 24 are about the same. It may be desirable to reduce the thickness of the brake lever 30 at the handle end 38. The handle end 38 has an aperture 39 through which a connecting ring or the like may be passed for attaching the brake lever to the safety belt of a workman or climber.

The brake lever 30 is pivotally mounted to the housing 20 by pivot pin 40 which passes through the first bearing aperture 28 of housing side wall 22, thence through the orifice 34 of the brake lever 30 and through the bearing aperture 28 of housing side wall 24. The pivot pin 40 is provided at one end with a head 42 with an aperture 44 for receiving the ring 92 of the safety chain 90. The safety chain is fastened to the side 22 of housing 20 by a rivet 94. The free end 46 of pivot pin 40 is tapered to aid in assembling the brake lever and pivot pin 40 in housing 20. A spring biased detent 48 locks the pivot pin 40 to the housing side wall 24 to prevent removal of the pivot pin. When the pivot pin 40 is to be removed pressure is applied to end 46 which forces the detent 48 to retract thereby allowing the pivot pin to slip through apertures 28 and orifice 34.

The brake lever 30 may be held in gripping engagement with rope 100 using actuating coil spring 50. Brake lever 30 pivots on pivot pin 40 to grip rope 100 as shown in FIG. 4 when actuating spring 50 is connected to the ring on post 70 on the housing side wall 22. The actuating spring 50 is attached to the handle end 38 of the brake lever 30 by a screw 52. The other end of actuating spring 50 is connected to the keeper ring 60, which in turn slips over post 70. Tension is applied to keeper ring 60 by holding spring 80. One end of the holding spring 80 is fastened to the housing side wall 22 by rivet 94 which also fastens safety chain 90 to the housing. The rivet 94 is located at the furthest distance possible from the post 70 to provide the maximum length for the holding spring 80 so that the holding spring 80 and actuating spring 50 will clear the pivot pin 40 and will not interfer when used in its non-spring loaded mode.

When the safety clamp appliance 10 is to be used for climbing, it is sometimes necessary to have the brake lever 30 in a non-spring loaded mode. This is because in ascending a safety rope, mountain climbers and cavers do not like the increased drag associated with spring loaded clamps. Spring loaded clamps are desirable for rescue, pack hauling and operations other than climbing. With the safety clamp appliance 10 of this invention it is a simple matter to convert from spring loaded to non-spring loaded by removing the keeper ring 60 from post 70. To facilitate removal of the keeper ring 60 a pull cord 96 may be provided.

While the preferred embodiment discloses the use of coil springs for the actuating spring 50 and the holding spring 80, it is possible to use some other type of spring means without departing from the invention. One type of spring means which could be used with the safety clamp appliance is two elastic bands which connect to the screw 52 on the brake lever 30 and to the rivet 94 on the housing 20. The elastic bands would be connected to a keeper ring 60 similar to the coil springs shown in FIG. 2. Another alternative would be to use a single elastic band with a keeper ring attached in the middle and the ends connected to the brake handle and the housings.

In use, the handle end 38 of the brake lever 30 is attached to the safety belt of a workman or climber by means of a connecting ring or the like. The clamp appliance itself is mounted on a safety rope by removing the pivot pin 40, placing the housing 20 on the rope and inserting the pivot pin through the apertures 28 in the housing and the orifice 34 in the brake lever. With the actuating spring 50 installed for spring loading the clamp appliance 10, the clamp appliance is maintained in position on the rope against falling under its own weight by the constant pressure against the rope of the brake surface 36 which in turn is under continuous torsioned pressure by the spring 50. As a person climbs a ladder or rocky cliff, the handle 38 of the brake lever 30 is pulled in an upward direction as shown by the arrow A in FIG. 4 where the movement of the brake lever is shown in phantom line. The upward pressure on the handle 38 relieves the pressure of the brake surface 36 against the rope 100, and permits the housing 20 to slide upwardly in the direction of arrow B of FIG. 4. The spring 50 exerts sufficient downward pressure on the handle 38 of the brake lever as to prevent the brake lever 30 from moving to its uppermost position with respect to the housing 20. Instead, the brake lever 30 ordinarily is raised with respect to the housing just enough to permit the safety rope 100 to slide freely through the housing. With the actuating spring 50 removed from the spring loaded mode, the brake lever is more easily pivoted out of engagement with the rope 100 which allows the housing to slide along the rope with any drag while mountain climbing or caving.

It will, of course, be understood that various changes may be made in the form, details, arrangements and proportions of the various parts without departing from the scope of the invention:

What is claimed is:

1. A safety clamp appliance comprising a housing having parallel side walls and a U-shaped rear wall, said housing being longitudinally slidable on a safety rope, a brake lever means having a brake means end and a handle end with a pivot point intermediate the ends, an actuating spring means connected at one end to said handle end of said brake lever means and to said housing at the other end, said brake lever means being pivoted by said actuating spring means into constant engagement with the safety rope, and a disconnect means for disconnecting said actuating spring means from said housing thereby changing the safety clamp appliance from being spring loaded to being non-spring loaded, said disconnect means being a keeper ring.

2. A safety clamp appliance as in claim 1 wherein a holding spring means connected to said keeper ring and to said housing prevents said actuating spring means from accidental release from said housing, holds the keeper ring flat against the housing and ties the brake lever to the housing.

3. A safety clamp appliance as in claim 2 wherein said actuating spring means is connected to a post means on said housing.

4. A safety clamp appliance as in claim 3 wherein said brake means is a brake foot having a gripping surface.

* * * * *